United States Patent Office 3,438,941
Patented Apr. 15, 1969

3,438,941
HOMOPOLYMERIZATION OF ACROLEIN IN AQUEOUS MONOMER EMULSION VIA REDOX CATALYST
George T. Kekish, Chicago, Ill., assignor to Nalco Chemical Company, Chicago, Ill., a corporation of Delaware
No Drawing. Filed Oct. 16, 1967, Ser. No. 675,316
Int. Cl. C08f 3/40, 1/62
U.S. Cl. 260—67                                      9 Claims

ABSTRACT OF THE DISCLOSURE

The present invention is directed towards an *all-aqueous* process for the polymerization of an α,β-ethylenically unsaturated aldehyde, and particularly is directed to the homopolymerization of an emulsion or dispersion of acrolein in water, wherein the preferred species water is added and the mix is diluted at spaced time intervals or incrementally from a preferred reactant ratio of acrolein to water of about 1:1 to a final ratio of about 1:4. A polymerization catalyst is used which is a unique combination of a redox system consisting of a synergistic oxidant component comprising ammonium persulfate and an active hydroperoxide or peroxide. This synergistic effect was observed in the oxidant combination reducer and this effect was more marked when the preferred hydroperoxides were used and was optimum with the use of tertiary alkyl hydroperoxides.

A most preferred hydroperoxide is tertiary butyl hydroperoxide and a most preferred ratio of persulfate/hydroperoxide is about 4:1 and preferred ratios show a predominance of the persulfate oxidant component (ratios by weight).

The reducing component of the redox is a conventionally prepared polyacrolein bisulfite adduct.

The ratio acrolein-water is initially preferably about 1:1 parts by weight and as the reaction proceeds by the preferred process, the mixture is diluted with water incrementally to control viscosity and give a final ratio of about 1:4 parts by weight. The use of the stepwise addition of the aqueous diluent and the unique combination of the dual oxidant component of the redox operation synergistically with the bisulfite reducing component are asserted for invention and novelty.

The remaining steps of the process are standard and well known in the art. For instance, such features as inert atmosphere (e.g. $N_2$); the preferred polymerization temperatures of about 0 to 40° C.; operating at an atmosphere pressure slightly greater than 1 atmosphere, utilization of acid pH medium to favor addition polymerization and separation and recovery of the polyacrolein polymer by differential solubility V$^s$ monomer in water are old and conventional in the art. Refer to Generalized Process, Post.

BACKGROUND OF THE INVENTION AND THE PRIOR ART

Historically, in the literature it is noted that *all-aqueous* polymerization of α,β-ethylenically unsaturated aldehydes has shown advantages in low solvent cost and freedom from cross-solubility in the inter-phase relationship where other methods use organic solvents. The *all-aqueous* polymerization of acrolein is old in the art. For example, aqueous homopolymerization of acrolein is taught in "Acrolein, Its Chemistry and Its Applications," Shell Chemical Corporation (1959), p. 59; "The Redox Polymerization of Acroleins In Aqueous Medium," Schultz et al., Macromolekular Chemie., vol. 24, No. 2, August 1957, pp. 141–151, and Welsh, U.S. 3,069,389, col. 1, lines 33–64.

Difficulties pointed out in the prior art in the *all-aqueous* polymerization are largely traced to the hydration of the polyacrolein and subsequent over-viscosity of the solution as well as the solubility (20%) and swelling effect of the monomer in the greater volume of water.

The polyacrolein products formed in the aqueous suspension method have been found to have higher molecular weights than the analogous products obtained in a non-aqueous system and this is related to the lower temperatures possible under the system of the present invention.

Relative to the actuation of the polymerization, the following is of interest, "Textbook of Polymer Chemistry," Interscience 1957), p. 25.

"As free radicals are formed, they migrate with the monomer phase where polymerization takes place . . . the system lends itself to allow polymerization to take place at high ratios and low temperatures where high molecular weight can simultaneously be obtained."

The polymers produced by the process of this invention may be used as additives, as for example, fixing starch in paper sizing, textile coating, etc.

The bisulfite adduct is a preferred emulsifier serving a dual purpose in this process. In this and other polymerization processes involving the redox system since it is an excellent emulsifier as well as the reducing agent of the redox.

INITIAL CONCENTRATION OF WATER

The initial concentration of water which is used as the sole polymerization medium in this process can vary from about 0.2 to about 2 parts by weight, based upon the water/acrolein ratio, with a preferred range of about 0.4:1 and an optimum range of about 1:1 of water/acrolein. It is to be noted that the monomeric acrolein is about 20% soluble in aqueous solution, and in this process the remainder is dispersed in bisulfite adduct serving here as a dispersing or emulsifying agent. The proper selection of the water concentration is governed by this solubility because in too low a water concentration the emulsifying or dispersing agent is not effective and the polymerization rate goes down; whereas, on the other hand, too high a concentration of water results in low yields due to the comparatively high aqueous solvency of acrolein in water.

It is essential that in this reaction the aqueous diluent containing the emulsifier be of an acid pH of less than 7, and preferably in the range from about 1 to 3. This is achieved by the natural acidity of the bisulfite adduct and initial acid pH control as by mineral acid addition. It has been found that when the diluent has a pH about 7, unwanted side products caused by condensation polymerization occur and result in the production of a low molecular weight product.

ADDITIONAL WATER DURING POLYMERIZATION

The tendency of the product polyacrolein to agglomerate and form lumps, which if unchecked will interrupt the stirring and agitation necessary to complete the reaction, can be alleviated by the addition of aqueous diluent during the process of the reaction. Generally, the addition of water in a 6 to 8 hour run occurs during the first half of the run where most of the viscosity difficulty occurs. Generally, this is where 20–90% of the polymerization occurs, excluding the first few minutes of activation time. It has been found that incremental addition of water in stepwise fashion greatly assists the operation. It has been further found that if an initial ratio of water to acrolein is about 1:1, then a preferred operation range for the final water/acrolein ratio is about 3:1 to 5:1, and a most preferred value is about 4:1 by weight.

THE COMPOUND REDOX CATALYST SYSTEM

The present catalyst system involves an improvement over the prior art adapted especially for α,β-ethylenically unsaturated aldehydes such as acrolein, preferably, and to methacrolein and α-ethyl acrolein, e.g., this system could also be operable in combinations where polymerization is not of the homopolymerization variety, but involves the copolymerization of such an aldehyde with other ethylenically unsaturated monomers such as acrylonitrile, itaconic acid and the like, where the addition polymerization proceeds through the C=C.

Redox systems for unsaturated aldehydes have been known in the past and the current state of the art may well be understood following the teachings of 3,277,057 (Campanile), particularly at col. 2, line 59, through col. 3, line 34, setting out free radical oxidants and reducing components. However, it was found that the haphazard use of any redox combination gave rise to certain failings in the product. For example, when homo- or copolymerization of acrolein was attempted using ferrous ammonium sulfate as the reducing agent, the polymer disadvantageously retained certain properties of the ferrous/ferric salt combination and was deficient for certain uses such as dielectric purposes and the paper arts. Again, as to the oxidant component of the redox, no single redox oxidant gave satisfactory results demanded where plant use and economics were contemplated.

It was found that the prior art processes combining persulfate and bisulfite will not produce the results of the present invention. For example, 3,084,992 (Schlack et al.) describes an alkali persulfate/alkali bisulfite redox system wherein the bisulfite may be derived from an acrolein bisulfite adduct. It was also found in screening for a better redox system for the aldehyde system that the combination of the tertiary alkyl hydroperoxide/alkali bisulfite adduct was not satisfactory for commercial plant purposes. The explanation of this is not altogether clear. However, it is theorized that it does resolve around the presence of the $HSO_3^-$ ion which apparently in the function as the reducing segment of the redox catalyst requires both of the present oxidant components.

The present invention overcomes many of the difficulties of the prior art which would face a worker in the art, as well as the practical experience leading up to the present invention. Summarily, the present invention, as to the redox system, requires preferably a major amount of ammonium persulfate and a minor amount of a tertiary alkyl hydroperoxide. The selection of the tertiary alkyl hydroperoxide was on the basis of yields pointing towards a synergistic effect wherein these particular oxidizing agents were combined. The addition of a minor amount of tertiary alkyl hydroperoxide apparently superactivates the greater amount of the ammonium persulfate, so that the two in combination act catalytically with activity greater than their additive effects. Among the preferred tertiary alkyl hydroperoxides which can be utilized for the present invention are tertiary butyl hydroperoxide, tertiary amyl hydroperoxide, etc.

Operable, but not preferred, are aryl hydroperoxides such as cumene hydroperoxide and peroxides such as lauryl peroxide, benzoyl peroside, dicumyl peroxide, di-tertiary butyl hydroperoxide, etc.

The ratio of persulfate/alkyl hydroperoxide may range from about 5:1 to about 1:5 by weight, and a most preferred ratio is about 4:1 by weight. The equivalent molar ratio of persulfate/alkyl peroxide is from about 3:1 to 1:3. A most preferred combination for activity for the catalyst in the present invention is ammonium persulfate/tertiary butyl hydroperoxide in the ratio of about 4:1 by weight. Thus, although combinations favoring persulfate predominance are preferred, the opposite ratios are operable.

Moreover, the mixed crucial oxidant component of the present invention may have a makeup of a persulfate/hydroperoxide ratio varying from about 5:1 to 1:5. Again, increased synergistic effect of this combination is achieved when the persulfate fraction is superior to the hydroperoxide fraction. Thus, an optimum ratio is about 4:1 persulfate/hydroperoxide.

The concentration of the free radical persulfate fraction in the redox may function within wide limits and operable for this invention are the catalyst concentration ranges of the disclosure 3,069,389 (Welch), at col. 6, line 59, through col. 7, line 4: namely, preferred 0.05–2% by weight of the acrolein monomer (solids). Additionally, by the present combination redox it has been possible to use lower operable free radical promoters such as a concentration of 2 mM. Persulfate/M acrolein and with about ¼ as much preferred for the hydroperoxide cosynergist.

The concentration of the reducing agent component can vary, for example, from about 0.5 percent by weight, or lower, to about 10 percent by weight (of solids), or higher, based on the weight of the acrolein monomers; and since the bisulfite adduct acts also as an emulsifier, these ranges are also applicable to its function as an emulsifier.

It has been found that high concentrations of catalyst above the upper limit, relative to the concentrations of the acrolein monomers, leads to the formation of undesirable low molecular weight polymers only. Furthermore, concentration of catalyst below the minimum value results in uneconomic, low polymerization rates.

GENERALIZED PROCESS OF HOMOPOLYMERIZATION OF ACROLEIN BY INERT EMULSION TECHNIQUE

Step 1.—Preparatory to treatment the reactor was purged with nitrogen, vacuum was applied, and then purged again with pre-purified nitrogen. Such treatment (i.e. purging and inert atmosphere) is conventional: see 3,084,992 (Schlack et al.), Example 12; Welch 3,069,389, col. 5, lines 53–62, denotes other gases useful in providing an inert atmosphere to prevent oxidation of the acrolein monomer. These gases include carbon dioxide, argon, methane, ethane, and the like.

Step 2.—After purging the reactor, 75 parts of DI water was added. (DI water is used so that the dissolved oxygen in the water is removed. Further, in order to completely remove dissolved oxygen from DI water, oxygen can be eliminated by either boiling or purging with nitrogen. Due to the sensitivity of the acrolein, tap water is not operable, but the DI or treated DI water is required.)

Step 3.—Fifteen parts of a 20% polyacrolein Na bisulfite adduct was added and mixed slowly to insure homogeneous solution. The addition of the acid emulsifier reduced the pH of the acid side (15 parts 20% emulsifier). It is noted that for the purposes of the present invention the bisulfite adduct acts both as an emulsifier and as the reducing component for the redox system. Kern et al. 3,206,422 teaches the use of the polyacrolein bisulfite adducts as sole emulsifying agent in acrolein polymerization. The emulsifier was prepared by acidifying polyacrolein-$NaHSO_3$ adduct with 20% concentrated HCl to reach a pH of 1.5. In the laboratory 100 grams of polyacrolein-$NaHSO_3$ adduct 20% (pH 4.4) required 1.1 gram of concentrated HCl to modify the pH to the desired acid value.

Step 4.—100 parts of monomeric acrolein was distilled into the reactor.

Step 5.—Add 20 p.p.m. of hydroquinone. This feature is conventional in the art. For example, 2,401,776 (Rothrock), at col. 1, teaches the use of hydroquinone in the polymerization of acrolein as a condensation polymerization inhibitor.

Step 6.—Agitate for 15 minutes to make a good emulsion. Dependent upon the rate of agitation and the volume of the vessel particularly, the obtaining of a good emulsion may require more or less time.

Step 7.—The ammonium persulfate component was added by dissolving in this case 0.815 part of ammonium persulfate in 10 parts of DI water and the solution was added slowly over several minutes to the reactor (15 minutes).

Step 8.—After a time interval of about 5 minutes, the peroxide oxidant was added. In this case, 0.2 part of tertiary butyl hydroperoxide was added to the reactor.

Step 9.—The reactants having been furnished to the reactor, the system was closed and slight nitrogen pressure was applied for the reason stated in 1. A convenient pressure above atmospheric is 2 to 3 p.s.i.

Step 10.—The reaction temperature was set at 30° C. and maintained at the optimum 30–32° C. during the exothermic polymerization reaction. Control of the temperature during the reaction was by cooling. This temperature is conventional and preferred for invert emulsion polymerization of acrolein. Variations from about 30° C. are discussed in 3,069,389 (Welch) at col. 7, lines 5–12, in connection with this type reaction.

Step 11.—Stepwise, during the first 3 hours of operation, dilution water is added as required by the viscosity of the polymerization slurry. From the time of the addition of the catalyst, dilution water was added stepwise or incrementally during the period ½–3 hours after addition of the catalyst. A total of about 300 parts of dilution water was added in this case.

Step 12.—At the completion of the reaction after 6 hours, water (DI water) in amounts of about 250 parts was added to this slurry and the unreacted monomer was vacuum stripped from the reaction medium. Foaming and overboiling was controlled by heat and pressure means.

Step 13.—A sample of the polyacrolein slurry was removed and solids content was determined. Thereafter moisture was removed from an aliquot or measured portion of the hydrated polyacrolein and yield was determined for polyacrolein product.

Step 14.—Using a 35% solution of $NaHSO_3$ in water, equal parts of sodium bisulfite were reacted in about a 1:1 ratio with the hydrated polymer produced above.

Step 15.—A reactor was charged with the polyacrolein slurry.

Step 16.—While agitating the solution, $NaHSO_3$ was added.

Step 17.—The total solids concentration (hydrated polymer+$NaHSO_3$) was adjusted to about 20% with DI water, and the pH was adjusted to the range of about 4.5 to 5.0 with an aqueous alkali such as NaOH (50%).

EXAMPLE I

Into a reactor purged with nitrogen was introduced:

100 grams of acrolein monomer (ACR—Shell)
15 grams polyacrolein bisulfite adduct, 20%
pH 1.4 (acidified with concentrated HCl)
85 ml. $H_2O$ (distilled-oxygen free)
0.815 gram ammonium persulfate (AP)
0.2 gram tertiary butyl hydroperoxide (t-BHP).

The AP and then the t-BHP fractions of the oxidant component of the redox catalyst were added stepwise into the reactor after the other components had been mixed.

In the present process the adduct serves both as an emulsifying agent and as a reducing agent for the redox.

After the addition of the peroxide, the reactor was closed and external heat was applied to bring the reaction temperature to about 30° C. (30° C.±2), and during the polymerization reaction, which is exothermic, external cooling was administered to keep the reaction at set temperature for 6 hours. During the first 3 hours, additional water was introduced incrementally in 50 ml. portions (total 300 ml.) at spaced time intervals as made necessary by the viscosity of the slurry and agglomerates. At the end of 6 hours, the reactor was opened and additional water (200 ml.) was added. The precipitate was filtered, the product weight was 372 g., solids 21.5 %, yield 77%.

EXAMPLE II

Into a reactor purged with nitrogen was introduced:

| | |
|---|---|
| Acrolein (ACR—Dist.) | grams__ 100 |
| Polyacrolein bisulfite adduct (pH 1.0) | do__ 15 |
| $H_2O$ | ml__ 85 |

Subsequently the catalyst oxidants were introduced sequentially with a 5 minute interval between the two as follows:

| | Gram |
|---|---|
| Ammonium persulfate (AP) | 0.815 |
| Tertiary butyl hydroperoxide (t-BHP) | 0.2 |

After addition of the oxidant component of the redox above, the reactor was closed and temperature control was maintained at 30° C.±2° for 6 hours. At spaced intervals during about the first 3 hours, additional water was added stepwise in 50 ml. portions and a total of 300 ml. was added. At the end of 6 hours, the reactor was opened, 300 ml. of water was added and vacuum applied to flush the unreacted acrolein monomer.

EXAMPLE III

A portion of the polyacrolein product from Example II was placed in a reactor with a sodium bisulfite solution made from 130 grams $NaHSO_3$ and 270 ml. $H_2O$ dissolved and added by solution. This amounted to using equal parts of sodium bisulfite in a 1:1 ratio with a calculated hydrated polymer of acrolein. The reactor was charged with the polyacrolein slurry and the sodium bisulfite solution added while vigorous agitation was maintained. By addition of water (DI) the total solids concentration was adjusted to about 20% (total solids= hydrated polymer+$NaHSO_3$). After satisfactory solids adjustment the pH was adjusted to a range of about 4.5–5.0 using 50% NaOH. Heat was applied to the reactor to bring the reaction temperature to about 90° C. for 2 hours. Shortly before the time period had elapsed, it was observed that all of the polyacrolein polymer had dissolved. The product was cooled and filtered through a cartridge. Weight 1125 g., solids 21.5%, yield 88% of the polyacrolein adduct.

EXAMPLE IV

Into a reactor purged and repurged with nitrogen was introduced:

| | Grams |
|---|---|
| Acrolein monomer | 100 |
| Boiled water | 165 |
| Polyacrolein bisulfite adduct, 20% | 15 |

Afterwards, in stepwise fashion, the oxidant components of the redox were added with a 5 minute time interval between addition of the fractions.

| | Gram |
|---|---|
| Ammonium persulfate (AP) | 0.815 |
| Tertiary butyl hydroperoxide (t-BHP) | 0.815 |

Prior to addition to the mix, the pH of the adduct was lowered with a mineral acid (HCl) to a pH of about 1.5. In this case 100 grams polyacrolein $NaHSO_3$ adduct 20% with a pH of 4.4 requiring 1.1 grams of concentrated HCl to achieve the pH modification. After addition of the peroxide, the reactor was closed and agitation was maintained during the reaction. External heat was applied to bring the reaction temperature to about 30° C. (30° C.±2) and during the polymerization reaction, which is exothermic, external cooling is administered to keep the reaction at the set temperature for six hours. After about 1 hour, it was noted that the mixture was a white, cloudy aqueous slurry in which large particles of polymer could be seen.

From time 1.5 hours to 3.0 hours agitation was maintained necessary at spaced intervals, 250 grams addition of water were made to the mix to give a total dilution of 550 grams of water. At the end of 6 hours, the reaction was considered complete and a large volume of water was added to flush the monomer. The polyaldehyde product was filtered and dried. Yield 92.0 grams, 92% polyacrolein.

I claim:
1. In a process for aqueous monomer emulsion homopolymerization of an $\alpha,\beta$-ethylenically unsaturated aldehyde monomer using an initial reactant radio of water/acrolein of about 1:1 and during the polymerization reaction, changing said ratio to about the range 3:1 to 5:1 by water dilution, the step which comprises using as a polymerization addition catalyst a redox system consisting of an oxidant component comprising a mixture of ammonium persulfate and an active peroxide, and a reducing component comprising polyacrolein bisulfite adduct, and polymerizing in an inert atmosphere at a temperature from about 0 to 40° C. and at a pressure slightly above atmospheric, and separating and recovering the $\alpha,\beta$-ethylenically unsaturated aldehyde polymer.
2. The process of claim 1, wherein the $a,\beta$-ethylenically unsaturated aldehyde is acrolein.
3. The process of claim 1, wherein the redox oxidant comprises a mixture of ammonium persulfate and an active hydroperoxide in a ratio of about 5:1 to 1:5 by weight.
4. The process of claim 1, wherein the redox oxidant comprises a mixture of ammonium persulfate and tertiary alkyl hydroperoxide in a ratio of about 5:1 to 1:5 by weight.
5. The process of claim 1, wherein the hydroperoxide is a tertiary butyl hydroperoxide.
6. The process of claim 1, wherein the hydroperoxide is tertiary butyl hydroperoxide and the ratio of persulfate/hydroperoxide is about 4:1 by weight.
7. The process of claim 1, wherein the initial reactant ratio of water/acrolein is about 1:1 by weight and water is added incrementally to dilute the polymerization mixture during polymerization to a final ratio of acrolein to water of about 3:1 by weight.
8. The process of claim 1, wherein the initial reactant ratio of water/acrolein is about 1:1 by weight, and during the reaction the ratio of water is increased to about 4:1 by weight.
9. The process of claim 1, wherein the aldehyde polymer is reacted with about an equal part of sodium bisulfite at a pH of about 4.0–5.0 and a temperature of about 90 to 100° C. for about 1–3 hours and separating the formed aldehyde polymer bisulfite adduct.

References Cited
UNITED STATES PATENTS

| 3,235,524 | 2/1966 | Kern et al. | 260—29.6 |
| 3,258,451 | 6/1966 | Rink et al. | 260—67 |

WILLIAM H. SHORT, *Primary Examiner.*

L. M. PHYNES, *Assistant Examiner.*